United States Patent [19]

Ancona et al.

[11] Patent Number: 4,836,396
[45] Date of Patent: Jun. 6, 1989

[54] COMBINATION CANISTER COVER AND COOKIE CUTTER

[75] Inventors: Jane Ancona; Bruce Ancona, both of New York, N.Y.

[73] Assignee: M. Kamenstein, Inc., White Plains, N.Y.

[21] Appl. No.: 222,068

[22] Filed: Jul. 8, 1988

[51] Int. Cl.$^4$ .............................................. A47J 43/18
[52] U.S. Cl. ................................... 220/212; 206/457; 30/123; 30/301; 215/228
[58] Field of Search ....................... 220/212; 215/228; 206/457, 575, 216; 30/122, 123, 301, 316

[56] References Cited

U.S. PATENT DOCUMENTS 2,997,788  8/1961  Gilbert ................................. 30/123
3,921,801  11/1975  Sway ..................................... 206/575

Primary Examiner—John Fox
Attorney, Agent, or Firm—Henry R. Lerner

[57] ABSTRACT

A combination canister cover and cookie cutter includes a disc-like central member having an upper surface and a lower surface; a lower cylindrical skirt extending downwardly from the periphery of the disc-like central member; screw threads formed on the inner surface of the cylindrical skirt to permit the combination cover and cookie cutter to be screw-threadedly received on a container; a handle extending from the lower surface of the disc-like central member within the boundary of the lower cylindrical skirt; a raised image forming pattern formed on the upper surface of the disc-like central member; and an annular cookie cutting rim extending from the periphery of the upper surface of the disc-like central member in surrounding relation to the raised image forming pattern and at a height greater than the height of the raised image forming pattern.

8 Claims, 2 Drawing Sheets

COMBINATION CANISTER COVER AND COOKIE CUTTER

BACKGROUND OF THE INVENTION

The present invention relates generally to cookie cutting devices, and more particularly, is directed to a combination canister cover and cookie cutter.

Cookie cutters as known in the art such as in U.S. Pat. No. 2,499,309 are generally single purpose devices which are stored together with other baking implements in a drawer or closet. Therefore, such cookie cutters are generally not readily accessible.

It has therefore been recognized that a cookie cutter could serve multiple purposes and, as shown in U.S. Pat. Nos. 220,781 and 1,253,836, such cookie cutters have been incorporated as closures for packages or jars. In both of these patents, however, the cookie cutter is on the inner side of the closure and does not provide image forming means for the central portion of the cookie.

Another example of the relevant prior art is U.S. Pat. No. 2,997,788 which relates to a container for a molding compound of natural or artificial clay or other material which is capable of being molded. This patent discloses a cylindrical container having a circular lid with a flange on its inner surface arranged in the outline shape of a symbol or representation, such as that of a fish. Thus, the lid can be used to mold the clay into the particular shape defined by the outline on the undersurface of the lid, which is transparent in order to permit the user to see the outline shape created on the undersurface of the lid.

Further, if the outline in said patent is provided on the upper surface, the outline would be on the same side as the flanges for securing the lid to the container. Therefore, the outline would be surrounded by the securing flanges. In such case, since the outline is of a lesser height than the flanges, the outline could therefore not be used for its intended purpose, namely, to cut or sever the shape of a fish from the clay. Still further, because the cutting edge itself is in the ornamental shape, it would be extremely difficult to use an ornamental shape of great complexity, that is, with many sharp angles and with fine detail. This is because the clay would fall apart where it is cut into a very thin section. As a result, the ornamental shapes that can be used with this patent are rather limited. In addition, the securing means, that is, the outer annular flange, may not provide adequate means for securing the lid tightly on a container.

Further absent from the prior art are cookie cutters incorporated as jar closures wherein independent means for holding the closure while forming the cookie are provided for facilitating the cutting and image forming step.

OBJECTS AND SUMMARY OF THE INVENTION

Accordingly, it is an object of the present invention to provide a combination canister cover and cookie cutter that overcomes the aforementioned problems encountered with the prior art.

It is another object of the present invention to provide a combination canister cover and cookie cutter in which the raised image forming pattern is provided on the upper surface thereof so as to be readily visible when the combination canister cover and cookie cutter is secured on a canister.

It is still another object of the present invention to provide a combination canister cover and cookie cutter in which the raised image forming pattern is formed on the upper surface thereof and a cookie cutting rim is formed in surrounding relation to the raised image forming pattern at a height greater than that of the raised image forming pattern.

It is yet another object of the present invention to provide a combination canister cover and cookie cutter in which dough for making a cookie is cut by a cookie cutting rim thereof and an image is simultaneously formed on the cut dough.

It is a further object of the present invention to provide a combination canister cover and cookie cutter, as aforementioned, in which the lower cylindrical skirt thereof is formed with internal screw threads for screw-threadedly securing the combination canister cover and cookie cutter on a canister.

It is a still further object of the present invention to provide a combination canister cover and cookie cutter, as aforementioned, which includes gripping means secured to the central member within the boundary of the cylindrical skirt by which the combination canister cover and cookie cutter can be held to sever the dough for making a cookie and to simultaneously form an image therein.

In accordance with an aspect of the present invention, a combination cover and cookie cutter includes a central member having an upper surface and a lower surface; a lower cylindrical skirt extending downwardly from the central member; threads formed on the inner surface of the lower cylindrical skirt to permit the combination cover and cookie cutter to be threaded onto the container; a raised image forming pattern formed on the upper surface of the central member; and a cookie cutting rim extending on the upper surface of the central member in surrounding relation to the raised image forming pattern and at a height greater than the height of the raised image forming pattern.

DETAILED DESCRIPTION OF THE PREFERRED EMBODIMENTS

Figure 1:
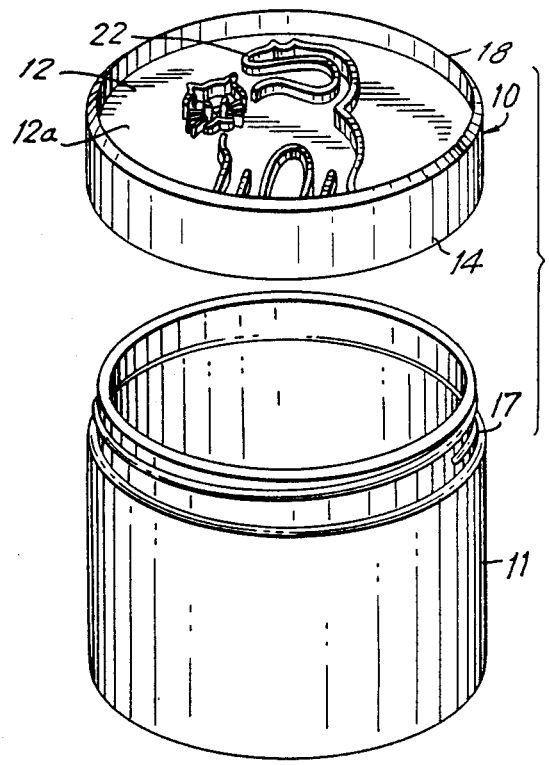
FIG. 1 is an exploded view, in perspective, showing the combination canister cover and cookie cutter according to one embodiment of the present invention together with the canister.

Referring to the drawings in detail, and initially to FIGS. 1-4, a combination canister cover and cookie cutter 10 according to a first embodiment of the present invention is adapted to define a closure for a canister 11. Cover 10 includes a central member in the form of a disc 12 having an upper surface 12a and a lower surface 12b. An annular cylindrical skirt 14 extends downwardly from the periphery of disc 12 and has internal screw threads 16 on the inner wall thereof which cooperate with external threads 17 on canister 11 to enable closure 10 to be secured onto the canister.

An annular cookie cutting rim 18 extends from the periphery of upper surface 12a of disc 12 and terminates at its upper end at a sharp annular cutting edge 20.

Figure 2:
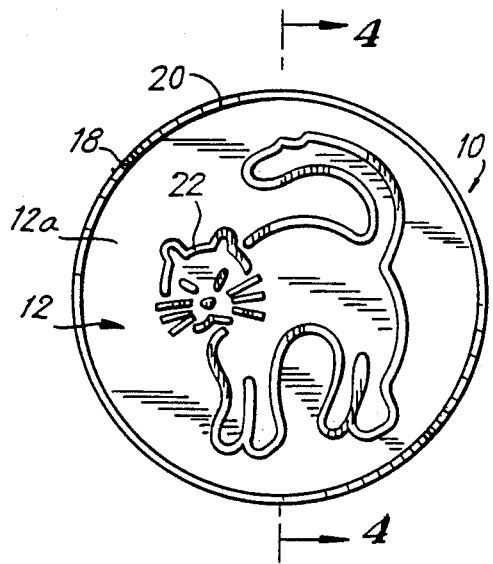
FIG. 2 is a top plan view of a combination canister cover and cookie cutter of FIG. 1.
Figure 3:
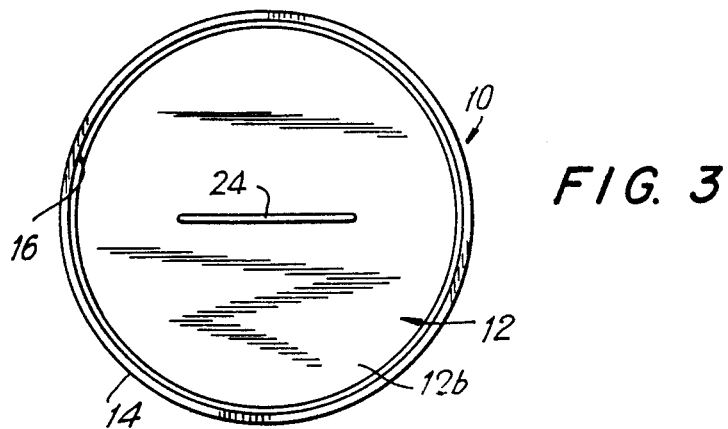
FIG. 3 is a bottom plan view of the combination canister cover and cookie cutter of FIG. 2.
Figure 4:
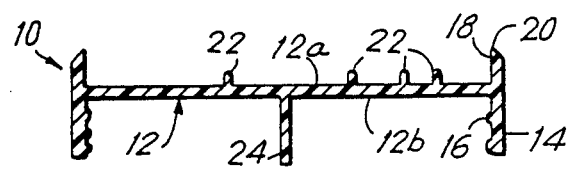
FIG. 4 is a cross-sectional view of the combination canister cover and cookie cutter of FIG. 2, taken along line 4—4 thereof.
Figure 5:
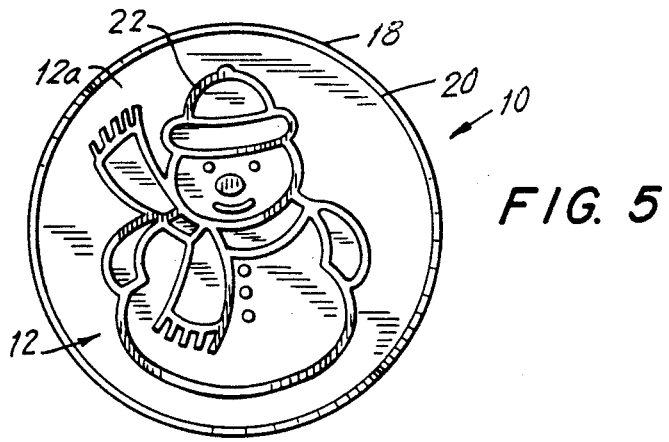
FIG. 5 is a top plan view of a combination canister cover and cookie cutter according to another embodiment of present invention.

A raised image forming pattern 22 is formed on upper surface 12a of disc 12 within the boundary of cutting rim 18, and is therefore readily visible when combination canister cover and cookie cutter 10 is threadedly received on the canister. As shown in FIG. 2, raised image forming pattern 22 is in the form of a cat. Image forming pattern 22, as shown in FIGS. 2 and 4, is made of a thin wall blade-like member extending from upper surface 12a and defining the desired image, such as the cat of FIG. 2. However, it will be appreciated that any suitable design can be formed thereon, such as the snowman shown in FIG. 5.

It will further be apprciated that raised image forming pattern 22 extends to a height which is less than the height of cutting rim 18. As a result, the dough for the cookie is severed by cutting rim 18 and is indented only by image forming pattern 22 merely to provide in the severed dough portion the desired image. This means that the raised image forming pattern 22 can be made with great complexity, that is, with many sharp angles and with intricate detail, since the image forming indentations do not sever or cut through the dough.

In addition, a thin rectangular handle 24 easily graspable between the fingers is provided on the lower surface 12b of disc 12 within the boundary defined by cylindrical skirt 14.

The combination canister cover and cookie cutter 10 is readily accessible for cutting cookies, since it is usually mounted on a readily available canister or the like, and is thus readily recognizable wherever stored. Accordingly, when a particular cookie cutter is desired, it is easily found mounted on a canister from which it is simply unscrewed and removed, ready to be used. Still further, while the contour of the cookie that is cut is relatively simple, for example, of circular shape, a more intricate design can be formed on the surface of the dough by raised image forming pattern 22.

Figure 6:
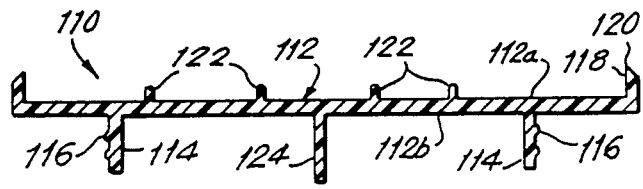
FIG. 6 is a cross-sectional view of a combination canister cover and cookie cutter according to still another embodiment of the present invention.

It will be appreciated that the present invention is not limited to the specific embodiments shown. For example, although disc 12 is shown having the same dimensions and shape as cylindrical skirt 14, disc 12 could have outer dimensions greater than that of cylindrical skirt 14, as shown in FIG. 6, in which elements corresponding to those in the embodiment of FIG. 4 are identified by the same reference numerals, augmented by 100, and a detailed description thereof will be omitted herein for the sake of brevity. Further, it will be appreciated that the central member 112 of combination canister cover and cookie cutter 110 of FIG. 6 need not have a circular configuration, but can, for example, have a square, rectangular, triangular or the like configuration. Further, the screw threads 116 could be provided on the external side surface of cylindrical skirt 114.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. A combination canister cover and cookie cutter, comprising:
    a central member having an upper surface and a lower surface;
    a lower cylindrical skirt extending downwardly from said central member;
    a raised image forming pattern formed on the upper surface of said central member;
    a cookie cutting rim extending from the upper surface of said central member in surrounding relation to said raised image forming pattern and at a height greater than the height of said raised image forming pattern; and
    means for releasably securing said combination cover and cookie cutter onto a canister.

2. A combination canister cover and cookie cutter according to claim 1; wherein said central member has a disc-like configuration.

3. A combination canister cover and cookie cutter according to claim 2; wherein said disc-like central member has a circular periphery; said lower cylindrical skirt extends downwardly from said circular periphery of said central member and said cookie cutting rim has a circular periphery of said disc-like central member.

4. A combination canister cover and cookie cutter according to claim 1; further including a handle extending from the lower surface of said central member within the boundary defined by said lower cylindrical skirt.

5. A combination canister cover and cookie cutter according to claim 4; wherein said handle is a thin member extending perpendicularly from said lower surface and easily graspable between the fingers of a person.

6. A combination canister cover and cookie cutter according to claim 1; wherein said means for releasably securing said combination canister cover and cookie cutter to the canister comprises threads formed on the inner surface of said cylindrical skirt.

7. A combination canister cover and cookie cutter according to claim 1; wherein said raised image forming pattern is formed by at least one thin wall blade-like member extending from the upper surface to a height less than that of said cookie cutting rim used to sever dough for making the cookie.

8. A combination canister cover and cookie cutter comprising:
    a disc-like central member having an upper surface and a lower surface;
    a lower cylindrical skirt extending downwardly from the periphery of the disc-like central member;
    screw threads formed on the inner surface of the cylindrical skirt to permit the combination cover and cookie cutter to be screw-threadedly received on a container;
    a plate-like handle secured to the lower surface of the disc-like central member within the boundary of the lower cylindrical skirt;
    a raised image forming pattern formed on the upper surface of the disc-like central member; and
    an annular cookie cutting rim extending from the periphery of the upper surface of the disc-like central member in surrounding relation to the raised image forming pattern and at a height greater than the height of the raised image forming pattern.

* * * * *